(12) United States Patent
Stichweh et al.

(10) Patent No.: US 10,312,838 B2
(45) Date of Patent: Jun. 4, 2019

(54) DRIVE SYSTEM

(71) Applicant: Lenze Drives GmbH, Extertal (DE)

(72) Inventors: Heiko Stichweh, Springe (DE); Felix Klute, Hameln (DE); Torben Jonsky, Hannover (DE); Thorsten Hohnsbein, Aerzen (DE); Volker Grabs, Bodenwerder (DE); Holger Borcherding, Hessisch Oldendorf (DE)

(73) Assignee: Lenze Drives GmbH, Exertal (DE)

( * ) Notice: Subject to any disclaimer, the term of this patent is extended or adjusted under 35 U.S.C. 154(b) by 0 days.

(21) Appl. No.: 15/753,859

(22) PCT Filed: Aug. 19, 2016

(86) PCT No.: PCT/EP2016/069721
§ 371 (c)(1),
(2) Date: Feb. 20, 2018

(87) PCT Pub. No.: WO2017/032716
PCT Pub. Date: Mar. 2, 2017

(65) Prior Publication Data
US 2018/0241326 A1     Aug. 23, 2018

(30) Foreign Application Priority Data

Aug. 21, 2015   (DE) .................. 10 2015 216 007

(51) Int. Cl.
*H02P 25/22* (2006.01)
*H02P 6/10* (2006.01)
(Continued)

(52) U.S. Cl.
CPC ................ *H02P 6/10* (2013.01); *H02P 25/22* (2013.01); *H02P 27/08* (2013.01); *H02P 27/14* (2013.01);
(Continued)

(58) Field of Classification Search
CPC ...... H02P 25/22; H02P 27/06; H02P 2207/05; H02P 25/022; H02P 27/04
See application file for complete search history.

(56) References Cited

U.S. PATENT DOCUMENTS 4,392,099 A     7/1983  Kuniyoshi
4,999,561 A *   3/1991  Kaga ..................... H02M 7/48
                                                      318/798
(Continued)

FOREIGN PATENT DOCUMENTS

DE    23 48 157 B2    4/1975
DE    30 06 034       8/1980
(Continued)

OTHER PUBLICATIONS

International Search Report (PCT/ISA/210) issued in PCT Application No. PCT/EP2016/069721 dated Nov. 29, 2016 with English translation (Six (6) pages).
(Continued)

*Primary Examiner* — Thai T Dinh
(74) *Attorney, Agent, or Firm* — Crowell & Moring LLP

(57) ABSTRACT

A drive system has an electric motor, wherein the electric motor includes a first three-phase stator winding system and a second three-phase stator winding system. The first and the second stator winding system are arranged on the stator in a manner rotated through an electrical phase angle in relation to one another. The drive system includes a frequency converter, wherein the frequency converter has a first bridge circuit arrangement which is designed to generate voltages for the first winding system and a second bridge circuit arrangement which is designed to generate voltages for the second winding system. The first bridge circuit arrangement and the second bridge circuit arrangement are connected in series. A control device is designed to actuate the first bridge
(Continued)

circuit arrangement and the second bridge circuit arrangement.

9 Claims, 1 Drawing Sheet

(51) Int. Cl.
 *H02P 27/08* (2006.01)
 *H02P 27/14* (2006.01)
 *H02M 7/5387* (2007.01)

(52) U.S. Cl.
 CPC ....... *H02M 7/5387* (2013.01); *H02P 2209/01* (2013.01)

(56) References Cited

U.S. PATENT DOCUMENTS

| | | | |
|---|---|---|---|
| 6,630,804 B2 | 10/2003 | Moriya et al. | |
| 6,710,495 B2 | 3/2004 | Lipo et al. | |
| 7,199,535 B2* | 4/2007 | Welchko | B60L 15/025 307/65 |
| 7,294,984 B2* | 11/2007 | Urakabe | H02P 25/20 318/378 |
| 7,439,697 B2* | 10/2008 | Miyazaki | B60L 11/123 310/112 |
| 7,800,331 B2* | 9/2010 | Chakrabarti | H02P 27/08 318/105 |
| 8,102,142 B2* | 1/2012 | Smith | B60L 11/1868 180/65.1 |
| 8,264,114 B2* | 9/2012 | Taniguchi | H02K 3/28 310/180 |
| 2005/0006958 A1* | 1/2005 | Dubovsky | H02J 3/382 307/64 |
| 2008/0258661 A1 | 10/2008 | Nagashima et al. | |
| 2013/0026968 A1 | 1/2013 | Tagome et al. | |
| 2015/0236634 A1* | 8/2015 | Han | H02K 11/0073 318/504 |

FOREIGN PATENT DOCUMENTS

| | | | |
|---|---|---|---|
| DE | 10 2006 056 855 A1 | 6/2008 | |
| DE | 10 2008 019 569 A1 | 11/2008 | |
| DE | 10 2007 054 228 A1 | 5/2009 | |
| DE | 10 2013 218 799 A1 | 3/2015 | |
| EP | 0 947 377 A2 | 10/1999 | |
| EP | 0947377 A2 * | 10/1999 | ............... B60L 9/28 |
| JP | 10-225181 A | 8/1998 | |
| JP | 2002-27761 A | 1/2002 | |
| JP | 2002-218793 A | 8/2002 | |

OTHER PUBLICATIONS

German-language Written Opinion (PCT/ISA/237) issued in PCT Application No. PCT/EP2016/069721 dated Nov. 29, 2016 (Eight (8) pages).

\* cited by examiner

DRIVE SYSTEM

BACKGROUND AND SUMMARY OF THE INVENTION

The invention relates to a drive system.

Drive systems, for example in the form of decentralized, permanently-excited synchronous machines (PMSM) with an integrated inverter, are suitable for a variety of applications. Decentralized drive technology is advantageously associated with a reduced complexity of cabling, more rapid installation and superior flexibility. At present, however, costs for a decentralized system are significantly higher than those associated with a comparable switchgear cabinet system. Moreover, as a result of the integration of the inverter, the rated capacity of decentralized systems is limited, on thermal grounds.

For many decentralized systems, in addition to costs, efficiency, the system power density and the continuous rating are also relevant factors.

The object of the invention is the provision of a drive system having a high system power density and a high efficiency.

This object is achieved by a drive system according to embodiments of the invention.

The drive system has an electric motor, specifically having an even number of phases. The electric motor has a first at least three-phase stator winding system and a second at least three-phase stator winding system, wherein the first and second stator winding systems are arranged on the stator in a manner rotated through an electrical phase angle in relation to each other.

The drive system further incorporates an inverter or frequency converter. The inverter or frequency converter has a first bridge circuit arrangement, which is designed to generate potentials or voltages for the first winding system. The inverter or frequency converter further incorporates a second bridge circuit arrangement, which is designed to generate potentials or voltages for the second winding system, wherein the first bridge circuit arrangement and the second bridge circuit arrangement are connected in series. The inverter or frequency converter further incorporates a control device, which is designed to actuate the first bridge circuit arrangement and the second bridge circuit arrangement.

In combination with the electric motor, the frequency converter can constitute a (decentralized) functional unit. To this end, the frequency converter can be mechanically coupled to the electric motor and, for example, fitted on top of a motor housing and screwed to the latter.

The first and second winding systems can be arranged on the stator, rotated through an electrical phase angle of 30 degrees in relation to each other.

The first bridge circuit arrangement and the second bridge circuit arrangement can respectively comprise power semiconductors, which are rated for a blocking voltage of up to 600 V. As a result of the series connection of the bridge circuit arrangements, the voltages to be switched are halved, in comparison with arrangements in which the bridge circuit arrangements are connected in parallel. Consequently, in a customary arrangement for the supply of the drive system from a three-phase network, it is not necessary to employ power semiconductors which are rated, for example, for a blocking voltage of up to 1,200 V.

The first bridge circuit arrangement and the second bridge circuit arrangement can respectively comprise at least one B6 bridge or three half-bridges.

To this end, the control device of the frequency converter can be designed to execute an individual current control function for each winding on the first and second winding systems.

The first three-phase stator winding system can be star-connected, and can comprise three phase terminals and a neutral conductor terminal, wherein the neutral conductor terminal is electrically connected to the neutral point. Correspondingly, the second three-phase stator winding system can be star-connected, and can comprise three phase terminals and a neutral conductor terminal, wherein the neutral conductor terminal is electrically connected to the neutral point. The first bridge circuit arrangement then comprises three output terminals, and the second bridge circuit arrangement then comprises three output terminals. The frequency converter then comprises a capacitive voltage divider, to which an intermediate circuit voltage is applied, wherein a first tap of the capacitive voltage divider is electrically connected to the neutral conductor terminal of the first three-phase stator winding system, wherein a second tap of the capacitive voltage divider is electrically connected to a connecting node of the first and second bridge circuit arrangements, wherein a third tap of the capacitive voltage divider is electrically connected to the neutral conductor terminal of the second three-phase stator winding system, wherein the output terminals of the first bridge circuit arrangement are electrically connected to a respective associated phase terminal of the first three-phase stator winding system, and wherein the output terminals of the second bridge circuit arrangement are electrically connected to a respective associated phase terminal of the second three-phase stator winding system.

A first output terminal of the three output terminals of the first bridge circuit arrangement can be electrically connected to a first phase terminal of the three phase terminals of the first three-phase stator winding system. A second output terminal of the three output terminals of the first bridge circuit arrangement can be electrically connected to a second phase terminal of the three phase terminals of the first three-phase stator winding system. A third output terminal of the three output terminals of the first bridge circuit arrangement can be electrically connected to a third phase terminal of the three phase terminals of the first three-phase stator winding system.

A first output terminal of the three output terminals of the second bridge circuit arrangement can be electrically connected to a first phase terminal of the three phase terminals of the second three-phase stator winding system. A second output terminal of the three output terminals of the second bridge circuit arrangement can be electrically connected to a second phase terminal of the three phase terminals of the second three-phase stator winding system. A third output terminal of the three output terminals of the second bridge circuit arrangement can be electrically connected to a third phase terminal of the three phase terminals of the second three-phase stator winding system.

The frequency converter can comprise the following: a third bridge circuit arrangement, which is designed to generate potentials for the first winding system, and a fourth bridge circuit arrangement, which is designed to generate potentials for the second winding system. The third bridge circuit arrangement and the fourth bridge circuit arrangement are connected in series. The first three-phase stator winding system then comprises six phase terminals, and the second three-phase stator winding system correspondingly comprises six phase terminals, wherein the first bridge circuit arrangement comprises three output terminals, the second bridge circuit arrangement comprises three output terminals, the third bridge circuit arrangement comprises three output terminals, and the fourth bridge circuit arrangement comprises three output terminals. The frequency converter then comprises the following: a capacitive voltage divider, to which an intermediate circuit voltage is applied, wherein one tap of the capacitive voltage divider is electrically connected to a connecting node of the first bridge circuit arrangement, the second bridge circuit arrangement, the third bridge circuit arrangement and the fourth bridge circuit arrangement, wherein the output terminals of the first bridge circuit arrangement and the output terminals of the third bridge circuit arrangement are electrically connected to a respective associated phase terminal of the first three-phase stator winding system, and wherein the output terminals of the second bridge circuit arrangement and the output terminals of the fourth bridge circuit arrangement are electrically connected to a respective associated phase terminal of the second three-phase stator winding system.

A first output terminal of the three output terminals of the first bridge circuit arrangement can be electrically connected to a first phase terminal of the six phase terminals of the first three-phase stator winding system. A second output terminal of the three output terminals of the first bridge circuit arrangement can be electrically connected to a second phase terminal of the six phase terminals of the first three-phase stator winding system. A third output terminal of the three output terminals of the first bridge circuit arrangement can be electrically connected to a third phase terminal of the six phase terminals of the first three-phase stator winding system. A first output terminal of the three output terminals of the third bridge circuit arrangement can be electrically connected to a fourth phase terminal of the six phase terminals of the first three-phase stator winding system. A second output terminal of the three output terminals of the third bridge circuit arrangement can be electrically connected to a fifth phase terminal of the six phase terminals of the first three-phase stator winding system. A third output terminal of the three output terminals of the third bridge circuit arrangement can be electrically connected to a sixth phase terminal of the six phase terminals of the first three-phase stator winding system.

A first output terminal of the three output terminals of the second bridge circuit arrangement can be electrically connected to a first phase terminal of the six phase terminals of the second three-phase stator winding system. A second output terminal of the three output terminals of the second bridge circuit arrangement can be electrically connected to a second phase terminal of the six phase terminals of the second three-phase stator winding system. A third output terminal of the three output terminals of the second bridge circuit arrangement can be electrically connected to a third phase terminal of the six phase terminals of the second three-phase stator winding system. A first output terminal of the three output terminals of the fourth bridge circuit arrangement can be electrically connected to a fourth phase terminal of the six phase terminals of the second three-phase stator winding system. A second output terminal of the three output terminals of the fourth bridge circuit arrangement can be electrically connected to a fifth phase terminal of the six phase terminals of the second three-phase stator winding system. A third output terminal of the three output terminals of the fourth bridge circuit arrangement can be electrically connected to a sixth phase terminal of the six phase terminals of the second three-phase stator winding system.

The electric motor is typically a rotating electrical machine, specifically in the form of a (permanently-excited) three-phase AC synchronous machine or a reluctance motor, etc.

The invention relates to a novel drive system comprised of a converter and an (electric) motor, which permits the employment of innovative control algorithms.

The majority of motors available on the market employ conventional three-phase systems. The advantages of multi-phase machines include, inter alia, a higher system power density, reduced torque ripple and superior failure safety. The disadvantages of multi-phase machines are associated with the increased complexity of power electronics, control functions and cabling.

In the present invention, for example, an asymmetrical six-phase permanently-excited synchronous motor with integrated power electronics can be employed. The motor comprises, for example, two three-phase systems, which are rotated through an angle of 30° in relation to each other. The number of slots on the motor can be a whole-number multiple of 12.

The flux density of the motor can be selected such that its harmonic content includes the third harmonic. This is a precondition for torque-generating harmonic content. The flux density characteristic can be selected such that said characteristic approximates to that of a brushless DC machine, which is trapezoidal. By means of the invention, for example, the advantages of a synchronous machine (controllability) can be combined with those of a brushless DC machine (higher power density).

The above-mentioned disadvantages of multi-phase machines only apply to the decentralized drive system design described herein to a limited extent: although the increased complexity of power electronics applies, this can be offset or outweighed by the use of novel components and innovative converter topologies. The decentralized design is not associated with an increased complexity of cabling. Although the complexity of control is increased, the employment of harmonics in the automatic control technology of the system contributes to an increase in power density.

According to the invention, for example, two different converter topologies can be employed, both of which can actuate six phases and can simultaneously impose any current characteristics required on the phases.

A first converter topology employs a series circuit of two B6 inverters, with a neutral conductor return path. In comparison with a conventional three-phase inverter, an additional B6 bridge is required for this purpose. The supposed cost disadvantage is offset, in that only half of the intermediate circuit voltage is present on each B6 bridge, rather than the full intermediate circuit voltage. It is thus possible to employ components with a blocking voltage of 600 V, which are both cost-effective and extremely compact. The design also permits the employment of MOSFETs. Moreover, the complexity of EMC arrangements is significantly reduced by the lower voltage which, given that EMC arrangements occupy up to 30% of the converter circuit board area, is a significant advantage. As the system dictates the imposition of the third harmonic on the current, a neutral conductor return path is required.

In a second converter topology, two additional B6 bridges are connected in parallel with the existing B6 bridges. This corresponds to the independent energization of the individual phases. As in the above-mentioned topology, the division of the intermediate circuit voltage likewise permits the employment of power semiconductors with a blocking voltage of 600 V here. For an identical motor, by the doubling of the number of B6 bridges, this circuit arrangement can deliver √3-times the capacity in only a slightly larger space, for which reason operation with MOSFETs is an option even for higher capacities (up to approximately 2.5 kW). Moreover, as a result of interconnection, a voltage is present on each circuit branch which is higher by a factor of √3 than in the first topology. This corresponds to a significant increase in capacity, with no significant increase in overall losses in the system, and thus an improvement in efficiency.

Not only the employment of B6 bridges, but also the replacement of a respective B6 bridge with three half-bridges, are conceivable for both technologies. Half-bridges with a blocking voltage of 600 V are increasingly widespread on the market, specifically those employing MOSFET technology.

Both topologies, by means of a return path arrangement or the omission of the neutral point, permit the imposition on the phases of any voltages or currents desired. Conversely to conventional converters, it no longer applies that the sum of all the currents/voltages must be equal to zero. This permits the optimum adaptation of the converter to the overall system, and fulfils preconditions for the employment of the motor properties for the purposes of automatic control.

The frequency converter is operated such that, by means of extended and field-oriented control, the imposition of a third harmonic on the system is achieved. This permits the execution of control for equal variables. To this end, the two 30°-offset three-phase systems are firstly transformed into a fixed-stator αβ-system. Thereafter, a dq0-transformation is executed on the system, for the transformation thereof into a fixed-rotor coordinate system. Thereafter, the two resulting zero components are transformed into a likewise co-rotating coordinate system, which rotates at three times the base field frequency. The overall transformation of phase quantities in the extended dq3-system gives the following:

$$\underline{T}_{uvw \to dq3} = \frac{2}{3} * \begin{bmatrix} \cos(\varphi) & \cos\left(\varphi - \frac{2\pi}{3}\right) & \cos\left(\varphi + \frac{2\pi}{3}\right) & 0 & 0 & 0 \\ -\sin(\varphi) & -\sin\left(\varphi - \frac{2\pi}{3}\right) & -\sin\left(\varphi + \frac{2\pi}{3}\right) & 0 & 0 & 0 \\ \frac{\cos(3(\gamma+\varphi))}{2} & \frac{\cos(3(\gamma+\varphi))}{2} & \frac{\cos(3(\gamma+\varphi))}{2} & \frac{\sin(3(\gamma+\varphi))}{2} & \frac{\sin(3(\gamma+\varphi))}{2} & \frac{\sin(3(\gamma+\varphi))}{2} \\ 0 & 0 & 0 & \cos\left(\varphi - \frac{\pi}{6}\right) & \cos\left(\varphi - \frac{5\pi}{6}\right) & \cos\left(\varphi + \frac{\pi}{2}\right) \\ 0 & 0 & 0 & -\sin\left(\varphi - \frac{\pi}{6}\right) & -\sin\left(\varphi - \frac{5\pi}{6}\right) & -\sin\left(\varphi + \frac{\pi}{2}\right) \\ -\frac{\sin(3(\gamma+\varphi))}{2} & -\frac{\sin(3(\gamma+\varphi))}{2} & -\frac{\sin(3(\gamma+\varphi))}{2} & \frac{\cos(3(\gamma+\varphi))}{2} & \frac{\cos(3(\gamma+\varphi))}{2} & \frac{\cos(3(\gamma+\varphi))}{2} \end{bmatrix}$$

For the characteristic of the air-gap field, a 2π-periodic function is assumed, in which the third harmonic is present, in addition to the fundamental wave. For the linkage flux $\Psi_c$, with an electrical angle $\varphi$ and fourier coefficients $a_1$ and $a_3$, this gives the following:

$\psi_c = a_1 * \cos(\varphi) + a_3 * \cos(3*\varphi)$.

For the electrical torque $M_{el}$, the following relationship applies:

$$M_{el} = p * \frac{\delta \Psi^T(\varphi)}{\delta \varphi} * I$$

where p is the pole pair number, $\underline{I}$ is the current vector and $\underline{\Psi}^T$ is the flux linkage vector. The employment of the values and a transformation in the dq3-system with the matrix $\underline{T}_{uvw \to dq3}$ gives the following for the torque vector:

$$M_{el} = \frac{3}{2} * p * \hat{\psi}_c \begin{bmatrix} 0 \\ a_1 \\ 0 \\ 0 \\ a_1 \\ 3a_3 \end{bmatrix}^T * \begin{bmatrix} I_{d1} \\ I_{q1} \\ I_{d0} \\ I_{d2} \\ I_{q2} \\ I_{q0} \end{bmatrix}.$$

It should be highlighted here that the third harmonic of the linkage flux, in combination with the current $I_{q0}$, contributes to a constant torque. The current $I_{q0}$ results in the imposition of third harmonics on the phase quantities. With respect to the characteristic of currents $I_0$ in the phase quantities, this means that these currents assume the form $I_{0,abs} = I_3 * \cos(3*\varphi)$ or $I_{0,xyz} = I_3 * \sin(3*\varphi)$. All currents, as is customary in field-oriented control, can be controlled by the linear control method. In comparison with a six-phase arrangement, a zero phase-sequence current in a three-phase motor generates a pulsed torque and, accordingly, cannot be employed. Further harmonics in the flux linkage characteristics can also be described by the variants envisaged here, and can be determined as influencing quantities.

BRIEF DESCRIPTION OF THE DRAWINGS

The invention is described in detail hereinafter, with reference to the drawings. In the drawings, schematically.

DETAILED DESCRIPTION OF THE DRAWINGS

Figure 1:
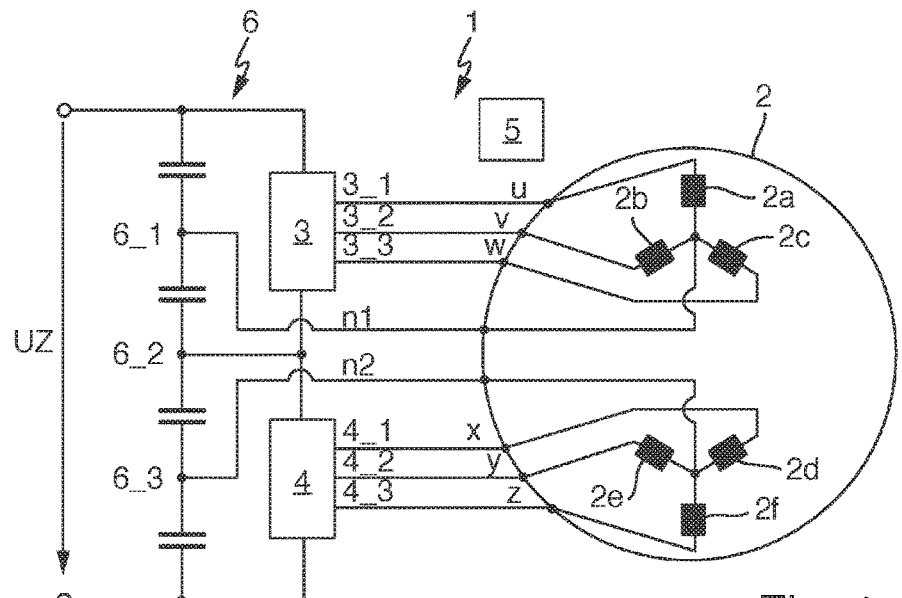
FIG. 1 shows a first form of embodiment of a drive system according to the invention.

FIG. 1 shows a first form of embodiment of a drive system 1 according to the invention. The drive system 1 comprises an electric motor 2, for example in the form of a permanently-excited synchronous machine, and a frequency converter.

The electric motor 2 has two respectively three-phase stator winding systems, each of which is star-connected. The stator winding systems respectively comprise three phase terminals u, v, w or x, y, z, and a neutral conductor terminal n1 or n2, wherein the neutral conductor terminals n1 or n2 are electrically connected to the respective neutral point. The first and second winding systems are arranged in a manner rotated through an electrical phase angle of 30 degrees in relation to each other.

The first winding system comprises three windings $2a$, $2b$, $2c$ in a star-connected arrangement. The second winding system correspondingly comprises three windings $2d$, $2e$, $2f$ in a star-connected arrangement. The winding $2a$ is looped-in between terminal u and terminal n1. The winding $2b$ is looped-in between terminal v and terminal n1. The winding $2c$ is looped-in between terminal w and terminal n1. The winding $2d$ is looped-in between terminal x and terminal n2. The winding $2e$ is looped-in between terminal y and terminal n2. The winding $2f$ is looped-in between terminal z and terminal n2.

The frequency converter comprises a first bridge circuit arrangement 3 in the form of a B6 bridge, and a second bridge circuit arrangement 4, likewise in the form of a B6 bridge. The first bridge circuit arrangement 3 and the second bridge circuit arrangement 4 are connected in series, wherein the intermediate circuit voltage UZ is applied to the series circuit. The first bridge circuit arrangement 3 comprises three output terminals $3\_1$, $3\_2$, $3\_3$. Correspondingly, the second bridge circuit arrangement 4 comprises three output terminals $4\_1$, $4\_2$, $4\_3$. A control device 5 of the frequency converter actuates the first bridge circuit arrangement 3 and the second bridge circuit arrangement 4. The B6 bridges 3 and 4 respectively comprise power semiconductors, which are rated for a maximum blocking voltage of 600 V.

The frequency converter further comprises a capacitive voltage divider 6, to which the intermediate circuit voltage UZ is applied. A first tap $6\_1$ of the capacitive voltage divider 6 is electrically connected to the neutral conductor terminal n1 of the first three-phase stator winding system. A second tap $6\_2$ of the capacitive voltage divider 6 is electrically connected to a connecting node of the first and second bridge circuit arrangements 3, 4. A third tap $6\_3$ of the capacitive voltage divider 6 is electrically connected to the neutral conductor terminal n2 of the second three-phase stator winding system.

The output terminals $3\_1$, $3\_2$, $3\_3$ of the first bridge circuit arrangement 3 are electrically connected to a respective associated phase terminal u, v, w of the first three-phase stator winding system ($3\_1$ to u, $3\_2$ to v, $3\_3$ to w). Correspondingly, the output terminals $4\_1$, $4\_2$, $4\_3$ of the second bridge circuit arrangement 4 are electrically connected to a respective associated phase terminal x, y, z of the second three-phase stator winding system ($4\_1$ to x, $4\_2$ to y, $4\_3$ to z).

The control device 5 is designed to execute an individual current control function for each winding of the first and second winding systems. The control device 5 actuates the bridges, 3, 4, such that the harmonic content of the flux density of the motor 2 includes the third harmonic. The flux density characteristic is selected such that said characteristic approximates to that of a brushless DC machine, which is trapezoidal.

Figure 2:
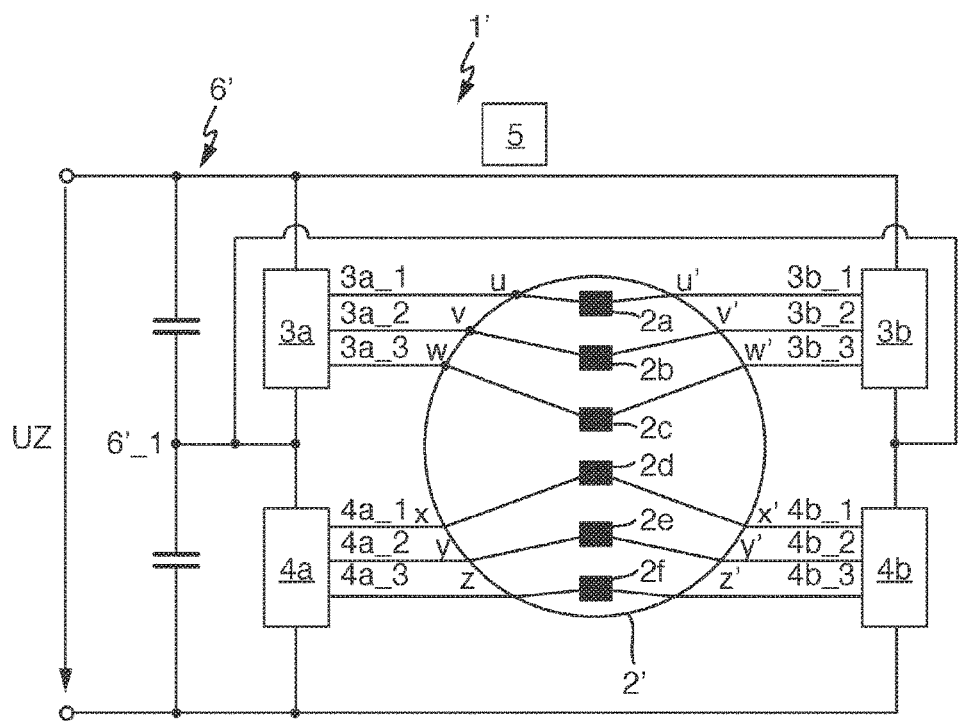
FIG. 2 shows a further form of embodiment of a drive system according to the invention.

FIG. 2 shows a further form of embodiment of a drive system 1' according to the invention. The drive system 1' comprises an electric motor 2', for example in the form of a permanently-excited synchronous machine, and a frequency converter.

The electric motor 2' has two respectively three-phase stator winding systems. The first three-phase stator winding system comprises six phase terminals u, v, w, u', v', w'. The second three-phase stator winding system correspondingly comprises six phase terminals x, y, z, x', y', z'. The first and second winding systems are arranged in a manner rotated through an electrical phase angle of 30 degrees in relation to each other.

The first winding system comprises three windings $2a$, $2b$, $2c$. The second winding system correspondingly comprises three windings $2d$, $2e$, $2f$. The winding $2a$ is looped-in between terminals u and u'. The winding $2b$ is looped-in between terminals v and v'. The winding $2c$ is looped-in between terminals w and w'. The winding $2d$ is looped-in between terminals x and x'. The winding $2e$ is looped-in between terminals y and y'. The winding $2f$ is looped-in between terminals z and z'.

The frequency converter comprises a first bridge circuit arrangement $3a$ in the form of a B6 bridge, and a second bridge circuit arrangement $4a$, likewise in the form of a B6 bridge. The first bridge circuit arrangement $3a$ and the second bridge circuit arrangement $4a$ are connected in series, wherein the intermediate circuit voltage UZ is applied to the series circuit. The first bridge circuit arrangement $3a$ comprises three output terminals $3a\_1$, $3a\_2$, $3a\_3$. Correspondingly, the second bridge circuit arrangement $4a$ comprises three output terminals $4a\_1$, $4a\_2$, $4a\_3$. The control device 5 of the frequency converter actuates the first bridge circuit arrangement $3a$ and the second bridge circuit arrangement $4a$. The B6 bridges $3a$ and $4a$ respectively comprise power semiconductors, which are rated for a maximum blocking voltage of 600 V.

The frequency converter additionally comprises a third bridge circuit arrangement $3b$ in the form of a B6 bridge, and a fourth bridge circuit arrangement $4b$, likewise in the form of a B6 bridge. The third bridge circuit arrangement $3b$ and the fourth bridge circuit arrangement $4b$ are connected in series, wherein the intermediate circuit voltage UZ is applied to the series circuit. The third bridge circuit arrangement $3b$ comprises three output terminals $3b\_1$, $3b\_2$, $3b\_3$. Correspondingly, the fourth bridge circuit arrangement $4b$ comprises three output terminals $4b\_1$, $4b\_2$, $4b\_3$. The control device 5 of the frequency converter actuates the third bridge circuit arrangement $3b$ and the fourth bridge circuit arrangement $4b$. The B6 bridges $3b$ and $4b$ respectively comprise power semiconductors, which are rated for a maximum blocking voltage of 600 V.

The intermediate circuit voltage UZ is applied to a capacitive voltage divider 6' of the frequency converter, wherein a tap $6'\_1$ of the capacitive voltage divider 6' is electrically connected to a connecting node of the first bridge circuit arrangement $3a$, the second bridge circuit arrangement $4a$, the third bridge circuit arrangement $3b$ and the fourth bridge circuit arrangement $4b$. The output terminals $3a\_1$, $3a\_2$, $3a\_3$ of the first bridge circuit arrangement $3a$ and the output terminals $3b\_1$, $3b\_2$, $3b\_3$ of the third bridge circuit arrangement $3b$ are electrically connected to a respective associated phase terminal u, v, w, u', v', w' of the first three-phase stator winding system.

The invention provides the following advantages.

By the employment of third harmonics, power losses can be reduced. In decentralized operation, this signifies that, at the same maximum temperatures, an increase in capacity can be achieved in the same structural space, or a lower temperature at an equal capacity.

Notwithstanding a greater number of components, the drive system according to the invention permits the employment of compact and efficient power semiconductors with equivalent, or even slightly lower costs. By the doubling of the B6 bridges employed, the form of embodiment represented in FIG. 2 permits an increase in capacity, as the phase voltage, and thus the capacity, is increased by a factor of $\sqrt{3}$.

Reduced electrical losses are associated with a smoothing of the current characteristic and a resulting reduction in copper losses, as these are associated with the current in a quadratic relationship. By the employment of the form of embodiment represented in FIG. 2, a higher capacity is achieved by an increase in the voltage, and thus in the motor speed. Accordingly, friction losses also increase, but to a significantly lower extent than the increase in capacity by a factor of $\sqrt{3}$.

The employment of 2 or 4 B6 bridges permits the distribution of power losses in the inverter between a number of modules. By means of this distribution, and the associated localized equalization, a superior evacuation of heat and thus a reduction in the maximum temperature of the inverter can be achieved. This advantage is of particular significance in highly-integrated drive systems with high power densities.

As an overall system, the novel combination of a motor, a frequency converter and control technology thus provides a superior system power density with relatively reduced power losses, and thus delivers an improved efficiency.

What is claimed is:

1. A drive system, comprising:
  an electric motor, wherein the electric motor has:
    a first three-phase stator winding system, and
    a second three-phase stator winding system, wherein the first and second stator winding systems are arranged on the stator in a manner rotated through an electrical phase angle in relation to each other; and
  a frequency converter, wherein the frequency converter comprises:
    a first bridge circuit arrangement which is configured to generate voltages for the first winding system,
    a second bridge circuit arrangement, which is configured to generate voltages for the second winding system, wherein the first bridge circuit arrangement and the second bridge circuit arrangement are connected in series,
    a third bridge circuit arrangement, which is configured to generate potentials for the first winding system, and
    a fourth bridge circuit arrangement, which is configured to generate potentials for the second winding system, wherein the third bridge circuit arrangement and the fourth bridge circuit arrangement are connected in series,
  wherein the first three-phase stator winding system comprises six phase terminals,
  wherein the second three-phase stator winding system comprises six phase terminals,
  wherein the first bridge circuit arrangement comprises three output terminals, the second bridge circuit arrangement comprises three output terminals, the third bridge circuit arrangement comprises three output terminals, and the fourth bridge circuit arrangement comprises three output terminals;
    a control device, which is configured to actuate the first bridge circuit arrangement and the second bridge circuit arrangement; and
    a capacitive voltage divider, to which an intermediate circuit voltage is applied, wherein one tap of the capacitive voltage divider is electrically connected to a connecting node of the first bridge circuit arrangement, the second bridge circuit arrangement, the third bridge circuit arrangement and the fourth bridge circuit arrangement, wherein the output terminals of the first bridge circuit arrangement and the output terminals of the third bridge circuit arrangement are electrically connected to a respective associated phase terminal of the first three-phase stator winding system, and wherein the output terminals of the second bridge circuit arrangement and the output terminals of the fourth bridge circuit arrangement are electrically connected to a respective associated phase terminal of the second three-phase stator winding system.

2. The drive system as claimed in claim 1, wherein the first and second winding systems are rotated through an electrical phase angle of 30 degrees in relation to each other.

3. The drive system as claimed in claim 2, wherein the first bridge circuit arrangement and the second bridge circuit arrangement, respectively, comprise power semiconductors which are rated for a blocking voltage of up to 600 V.

4. The drive system as claimed in claim 1, wherein the first bridge circuit arrangement and the second bridge circuit arrangement, respectively, comprise power semiconductors which are rated for a blocking voltage of up to 600 V.

5. The drive system as claimed in claim 1, wherein the first bridge circuit arrangement and the second bridge circuit arrangement, respectively, comprise at least one B6 bridge or three half-bridges.

6. The drive system as claimed in claim 1, wherein the control device is configured to execute an individual current control function for each winding on the first and second winding systems.

7. The drive system as claimed in claim 1, wherein the electric motor is a specifically permanently-excited synchronous machine.

8. The drive system as claimed in claim 1, wherein a first output terminal of the three output terminals of the first bridge circuit arrangement is electrically connectable to a first phase terminal of the six phase terminals of the first three-phase stator winding system,
  a second output terminal of the three output terminals of the first bridge circuit arrangement is electrically connectable to a second phase terminal of the six phase terminals of the first three-phase stator winding system,
  a third output terminal of the three output terminals of the first bridge circuit arrangement is electrically connectable to a third phase terminal of the six phase terminals of the first three-phase stator winding system,
  a first output terminal of the three output terminals of the third bridge circuit arrangement is electrically connectable to a fourth phase terminal of the six phase terminals of the first three-phase stator winding system,
  a second output terminal of the three output terminals of the third bridge circuit arrangement is electrically connectable to a fifth phase terminal of the six phase terminals of the first three-phase stator winding system, and
  a third output terminal of the three output terminals of the third bridge circuit arrangement is electrically connectable to a sixth phase terminal of the six phase terminals of the first three-phase stator winding system.

9. The drive system as claimed in claim 8, wherein a first output terminal of the three output terminals of the second bridge circuit arrangement is electrically connectable to a first phase terminal of the six phase terminals of the second three-phase stator winding system,
  a second output terminal of the three output terminals of the second bridge circuit arrangement is electrically connectable to a second phase terminal of the six phase terminals of the second three-phase stator winding system, a third output terminal of the three output terminals of the second bridge circuit arrangement is electrically connectable to a third phase terminal of the six phase terminals of the second three-phase stator winding system, a first output terminal of the three output terminals of the fourth bridge circuit arrangement is electrically connectable to a fourth phase terminal of the six phase terminals of the second three-phase stator winding system, a second output terminal of the three output terminals of the fourth bridge circuit arrangement is electrically connectable to a fifth phase terminal of the six phase terminals of the second three-phase stator winding system, and a third output terminal of the three output terminals of the fourth bridge circuit arrangement is electrically connectable to a sixth phase terminal of the six phase terminals of the second three-phase stator winding system.

\* \* \* \* \*